Figures 1, 2:
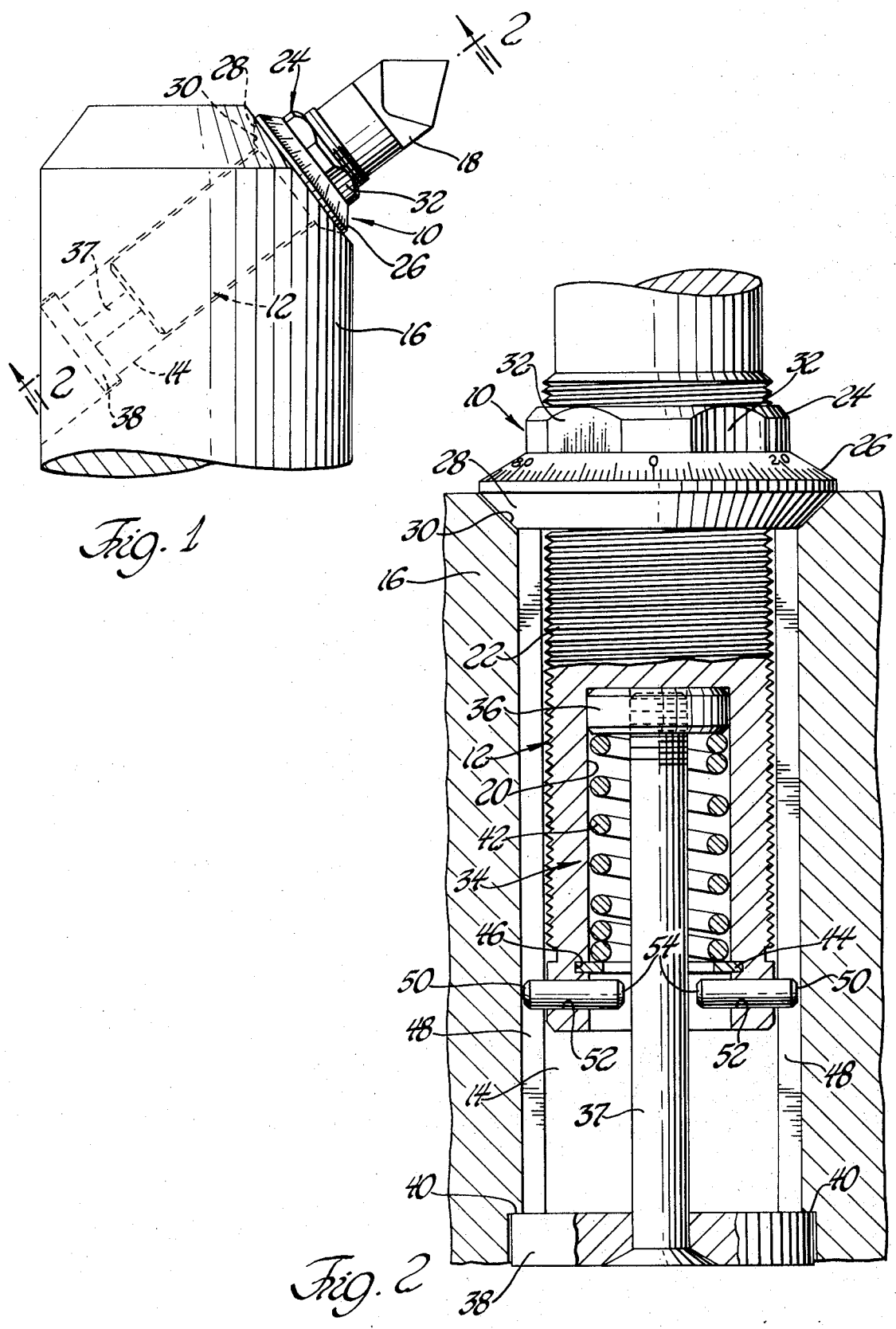

United States Patent [19]

Fitzsimmons

[11] 3,844,672

[45] Oct. 29, 1974

[54] EXTERNALLY ADJUSTABLE TOOL CARTRIDGE ASSEMBLY

[76] Inventor: Robert Fitzsimmons, 4451 Fenwick Dr., Warren, Mich. 48092

[22] Filed: Oct. 10, 1972

[21] Appl. No.: 296,472

[52] U.S. Cl. .............................. 408/155, 408/714
[51] Int. Cl. ........................................... B23b 29/14
[58] Field of Search ........... 408/154, 155, 156, 153, 408/714, 238, 239, 241 R, 181, 185

[56] References Cited
UNITED STATES PATENTS

| | | | |
|---|---|---|---|
| 3,178,739 | 4/1965 | Plummer et al. ............... | 408/239 X |
| 3,178,969 | 4/1965 | Yogus et al. ....................... | 408/154 |
| 3,213,717 | 10/1965 | Breuning ........................... | 408/154 |
| 3,313,187 | 4/1967 | Benjamin et al. ................. | 408/153 |
| 3,349,648 | 10/1967 | Holloway ........................... | 408/154 |

FOREIGN PATENTS OR APPLICATIONS

| | | | |
|---|---|---|---|
| 945,221 | 12/1963 | Great Britain ..................... | 408/153 |

*Primary Examiner*—Andrew R. Juhasz
*Assistant Examiner*—Z. R. Bilinsky
*Attorney, Agent, or Firm*—McGlynn and Milton

[57] ABSTRACT

An externally adjustable tool cartridge assembly including tool cartridge means for mounting a cutting tool within the locating hole of a tool housing wherein the tool cartridge means includes a bore extending partially therethrough; adjustment means for adjusting the cutting position of the tool cartridge means; retaining means, a portion of which is disposed within the bore, for retaining the tool cartridge means within the tool housing; the retaining means including resilient means disposed within the bore for facilitating the adjusting movement of the tool cartridge means independent of the position of the retaining means.

17 Claims, 2 Drawing Figures

EXTERNALLY ADJUSTABLE TOOL CARTRIDGE ASSEMBLY

This invention relates to cutting tool cartridges and particularly those which are held within the locating hole of a tool carrying housing. The tool carrying housing referred to may be of any configuration; however, for the purpose of convenience and by way of example the common boring bar is used in the following description and specification. That is not to say, however, that the instant invention does not have equal application with boring heads, boring blocks, or any other tool carrying housing but is used in a boring bar only to faciliate the explanation thereof.

Generally speaking, the boring bar consists of a heavy steel bar or rod which includes one or more locating holes along its length, each adapted to receive a tool cartridge. For our purposes the boring bar in the following discussion will include a single locating hole at its distal end for receiving a tool cartridge extending radially angularly thereto. The standard tool cartridge, that is, one which is in common use in the industry, includes a cylindrical body or member which may include an integral cutting tool or may be adapted to receive a throw-away cutting tool insert, whichever type is more desirable. The boring bar with the tool cartridge and cutting tool is mounted in a suitable boring machine and is thereby ready to machine the sides of a pilot hole in a workpiece.

The tool cartridge normally includes an internally threaded bore extending partially therethrough in the end of the tool cartridge which is held in the locating hole of the boring bar, which end is opposite the cutting tool. A lock screw having a lock washer extends through the end of the locating hole opposite the tool cartridge and engages the threaded bore in the tool cartridge to hold the tool cartridge and the cutting tool rigidly in place. The locating hole is provided with an outwardly facing shoulder which is engaged by the lock washer whereby tightening the lock screw draws the tool cartridge into tight engagement with the boring bar. Furthermore, the base of the tool cartridge is normally provided with stamped or machined keys which engage longitudinal keyways in the locating hole to nonrotatably hold the tool cartridge in place.

As in all metal working processes the need for greater accuracy and precision has increased in the last few decades, therefore, it has become extremely important that the cutting tool be adapted for convenient and accurate adjustment. In other words, the distance of radial extension of the cutting tool from the boring bar must be conveniently and accurately adjustable to control the inside diameter of the hole being machined. For this purpose, a micrometer adjustment is provided by including external threads on the body of the tool cartridge which are engaged by a threaded adjusting nut having a graduated dial. The adjusting nut nests in a conical seat surrounding the locating hole of the boring bar, the perimeter of which also includes a suitable vernier scale for accurately positioning the adjusting nut. Turning the adjusting nut threadedly moves the tool cartridge into or out of the boring bar to adjust the radial extension of the cutting tool.

The problem with this preliminary attempt at an adjustment mechanism is that once the lock screw is tightened down there can be no further adjustment of the tool cartridge because the outward movement of the tool cartridge is precluded by the engagement of the lock screw with the internal threads thereof. Adjustment of the cutting tool requires loosening the lock screw and turning the adjustment nut to the proper setting and thereafter tightening the lock screw while holding the adjustment nut in place. Not only is this procedure very inconvenient and time consuming, but oftentimes, the precise setting of the cutting tool and tool cartridge is lost when the lock screw is retightened.

The inability to easily and accurately make tool setting adjustments was quickly realized and one solution to the problem involved disposing a belleville-type spring between the lock washer and the shoulder in the locating hole of the boring bar. This particular solution was not satisfactory because it afforded a maximum adjustment range of only fifty thousandths of an inch in larger size tools with a smaller adjustment range possible for smaller tools.

An attempt at satisfying the need for a greater adjustment range resulted in a subsequent substantial change in the design and size of the tool cartridge and related auxiliary parts. The new design involved providing a relatively large bushing into which the tool cartridge and adjustment mechanism are received. In one particular representative design, a number of coil springs are disposed within the bushing around the perimeter of the tool cartridge and these springs engage a retainer disc which is attached to and spaced from the rear of the tool cartridge by a screw to urge the tool cartridge in a direction into the bushing. Turning the adjustment nut moves the tool cartridge out of the bushing against the action of the springs and reverse rotation of the adjustment nut will of course permit the springs to draw the tool cartridge back into the bushing thereby providing radial adjustment for the tool cartridge. Another unit employs a plurality of belleville-type springs disposed in a bushing around the tool cartridge with a similar retainer disc and screw; however, the operation of this unit is substantially similar to the one described above and includes the same drawbacks as are described hereinafter.

To facilitate the mounting of either design in the locating hole of the boring bar it is necessary to eliminate the lock screw which, in older designs, extended through the locating hole into the tool cartridge from the opposite side of the boring bar. In the older designs a relatively large and, therefore, strong lock screw was employed. In the newer designs the lock screw must be eliminated to provide for the retainer disc and screw and the lock screw is replaced by one or more holding screws which enter through the face of the bushing and into the boring bar; a much weaker arrangement at best.

The above described arrangement provides a substantial increase in the range of the adjustment of the tool cartridge and facilitates the ease and convenience thereof; however, this design is greatly burdened by the engineering problems which are generated. First of all, the size of the unit is substantially increased over the old design due to the size requirement of the bushing and springs. The size problem either precludes the use of this type holder with small boring bars or weakens the unit because the size of the tool cartridge is necessarily reduced to allow for a smaller bushing. Secondly, the elimination of the lock screw from the locating hole greatly reduces tool rigidity and stability in the boring bar. Finally, the large number of parts required makes this tool holder much more expensive, and the increase in size along with the change in design requires that many of the existing locating holes of boring bars now in use must be reworked to prepare them to receive externally adjustable tool holders of this design.

It is therefore an object and feature of the instant invention to provide an externally adjustable cutting tool cartridge assembly including tool cartridge means for mounting a cutting tool within the locating hole of a tool housing wherein the tool cartridge means includes a bore extending partially therethrough; retaining means, a portion of which is disposed within the bore for retaining the tool cartridge means within the tool housing; adjustment means for adjusting the cutting position of the tool cartridge means; and resilient means held within the bore of the tool cartridge and coacting with the retainer means for facilitating the adjusting movement of the tool cartridge means independently of the position of the retaining means.

It is another object and feature of the instant invention to provide an adjustable tool cartridge assembly wherein the retaining means extends through the locating hole of the tool housing and is anchored to a portion of the tool housing remote from the tool cartridge means whereby the tool cartridge will be securely anchored therein.

In accordance with the foregoing objects and features it is another object and feature of the instant invention to provide an externally adjustable tool cartridge assembly wherein the retaining means includes a first fastener member disposed within the bore of the tool cartridge means and a second fastener member connected to the first fastener member and anchored to the tool housing to retain the tool cartridge means rigidly within the locating hole thereof; the resilient means being disposed to urge the first fastened member into the bore and to permit movement of the tool cartridge independently of the first and second fastener members.

Other objects and attendant advantages of the instant invention will be readily appreciated as the same becomes better understood by reference to the following detailed description when considered in connection with the accompanying drawings wherein:

FIG. 1 is a side elevational view of a preferred embodiment of the instant invention; and FIG. 2 is a cross sectional view taken along line 2—2 of FIG. 1.

Referring to the drawings an externally adjustable tool cartridge assembly constructed in accordance with the instant invention is shown generally at 10. The cartridge means 10 comprises a tool cartridge generally indicated at 12 for mounting a cutting tool within the locating hole 14 of a tool housing 16. As was hereinbefore stated the cutting tool may be integrally formed with the end of the tool cartridge 12 as shown at 18 in FIG. 1 or the tool cartridge 12 may be of the type which is adapted to receive a throw-away cutter insert.

The tool housing 16 illustrated in the drawings comprises the distal end of a boring bar including the locating hole 14 which is disposed therein such that the tool cartridge 12, and consequently the cutting tool 18, extends radially therefrom at an oblique angle thereto for machining the interior walls of a pilot hole. The boring bar 16 and locating hole 14 are of standard configurations and are included in the following description for the purpose of providing an environment for the instant invention. It is to be understood that the instant invention has application with any type of tool housing such as boring blocks, and the like.

The tool cartridge 12 includes external threads 22 for receiving a standard adjustment nut 24. The adjustment nut 24 includes a graduated dial 26 and a conical portion 28 which is adapted to nest within a conical seat 30 formed in the outer end of the locating hole 14. The surface of the boring bar 16 immediately adjacent the conical seat 30 is provided with a suitable vernier scale (not shown) of the well known type for accurately positioning the adjustment nut 24. Furthermore, the adjustment nut includes a plurality of tool engaging flats 32 whereby a suitable wrench may be employed to engage the adjustment nut 24 for turning the same. As best shown in FIG. 2, rotation of the adjustment nut 24 causes the tool cartridge 12 to move in or out of the locating hole 14 in the boring bar 16 depending of course on the direction of rotation. As described hereinbefore this particular adjustment arrangement is commonly used with standard tool cartridges and it is the means for retaining the tool cartridge 12 within the boring bar 16 which enables the convenient and accurate use of the adjustment mechanism.

Accordingly, the tool cartridge 12 includes a bore 20 extending partially therethrough for receiving retaining means generally shown at 34. The retaining means includes a first fastener member comprising an internally threaded lock nut 36 and a second fastener member comprising a lock screw 37 having an elongated shank portion and a lock washer 38. The lock washer 38 engages an outwardly facing, annular shoulder 40 disposed in the locating hole 14. Furthermore the retaining means includes resilient means 42 disposed within the bore 20 for urging the lock nut 36 into the bore 20 and concurrently the spring force urges the tool cartridge 10 into the locating hole 14 to facilitate rigidly holding the tool cartridge 12 therein.

The tool cartridge 12 also includes holding means comprising a snap ring 44 disposed in an annular groove 46 for holding the resilient means within the bore 20.

A pair of longitudinal keyways 48 are disposed along the length of the locating hole 14. The tool cartridge 12 includes key means comprising a pair of pin members 50 disposed in radial holes 52 adjacent the end of the tool cartridge 12. The pin members 50 register with the keyways 48 to nonrotatably maintain the tool cartridge 12 within the locating hole 14. In prior tool cartridge designs the keys were provided by machining the same out of the tool cartridge base or the keys were stamped therein. Both of these procedures are expensive and costly. The keys comprising the pin members 50 are provided by merely drilling radial holes 52 in the sides of the tool cartridge 12 and inserting the pin members 50 therein. Additionally, the holding means comprising the snap ring 44 may be eliminated and their function replaced by the pin members 50. In other words, the coil spring 42 would be held in the bore 20 by means of longitudinal extensions 54 of the pin members 50 which protrude into the bore 20. This would of course eliminate the need for machining the annular groove 46. The pin members 50 would then simultaneously function as key means and holding means thereby reducing the number of parts required in the assembly.

From the above description it should be obvious that the tool cartridge 12 may be threadedly moved outwardly of the boring bar 16 independently of the position of the retaining means 34. In other words, referring to FIG. 2, once the tool cartridge 12 is secured within the locating hole 14 by tightening the lock screw 37 in the lock nut 36, the adjustment nut 24 may be turned to threadedly move the tool cartridge 12 outwardly. The tool cartridge 12 as shown in FIG. 2 is in the fully retracted position. As the tool cartridge 12 moves outwardly the lock nut 36 and lock screw 37 remain stationary relative to the boring bar 16 however the tool cartridge can move outwardly as the coil spring 42 is depressed. The coil spring 42, therefore, enables the tool cartridge 12 to thereafter be moved inwardly or outwardly while simultaneously retaining the tool cartridge 12 rigidly within the locating hole.

As hereinbefore described, the first tool cartridges used were provided with a bore similar to bore 20 except that it included internal threads. A lock screw similar to lock screw 37 was threaded into the threaded bore to hold the tool cartridge in place. A major advantage of the instant invention is that these older tool cartridges having an internally threaded bore may be easily reconditioned and reworked to provide the external adjustment as described above. More specifically, the internal threads in the bore of the older tool cartridges are simply machined out thereby providing the bore 20. Thereafter the lock nut 36 and coil spring 42 are disposed within the bore 20 and are held in place by the snap ring 44 or the pin members 50 whichever has been provided. Without necessitating any changes in the locating hole of the existing boring bar the tool cartridge 12 is then mounted therein and the lock screw 37 and lock nut 38 screwed into place to retain the tool cartridge 12 in the locating hole 14. It is noted that all other structural features such as the external threads and adjusting nut were present on the original tool before reworking. It is therefore contemplated that the teachings of the instant invention may be used to manufacture new tool cartridges 12 which are externally adjustable or to recondition old tool cartridges to provide the external adjustment feature.

The invention has been described in an illustrative manner and is to be understood that the terminology which has been used is intended to be in the nature of words of description rather than limitation.

Obviously, many modifications and variations of the instant invention are possible in light of the above teachings. It is, therefore, to be understood that the invention may be practiced otherwise than as specifically described and yet remain within the scope of the appended claim.

I claim:

1. An externally adjustable tool cartridge assembly of the type which is adapted to be received within the locating hole of a tool housing comprising: tool cartridge means for mounting a cutting tool within the locating hole of a tool housing, said tool cartridge means including a bore extending partially therethrough; adjustment means for adjusting the cutting position of said tool cartridge means; and retaining means for retaining said tool cartridge means within the tool housing; said retaining means including an elongated shank portion, one end of which is disposed within said bore and movable relative thereto, the other end of said shank portion being adapted for anchoring engagement with the tool housing and resilient means disposed within said bore and acting between said tool cartridge means and said shank portion for facilitating the adjusting movement of said tool cartridge means independent of the position of said retaining means.

2. An assembly as set forth in claim 1 wherein said shank portion extends through the locating hole and is anchored to a portion of the tool housing remote from said tool cartridge means.

3. An assembly as set forth in claim 1 wherein said tool cartridge means includes holding means for holding said resilient means within said bore.

4. An assembly as set forth in claim 3 wherein said retaining means includes a first fastener member disposed within said bore and a second fastener member connected to said first fastener member and anchored to the tool housing to retain said tool cartridge means rigidly within the locating hole thereof; said resilient means being disposed between said first fastener member and said holding means.

5. An assembly as set forth in claim 4 wherein said holding means for holding said resilient means within said bore includes a snap ring and an internal annular groove for holding said snap ring against axial movement in said bore.

6. An assembly as set forth in claim 5 wherein said tool cartridge means includes key means and the tool housing includes key ways disposed within the locating hole thereof for nonrotatably maintaining said tool cartridge means therein.

7. An assembly as set forth in claim 6 wherein said key means includes at least one pin member 50 and at least one radial hole disposed in said tool cartridge means for receiving said pin member.

8. An assembly as set forth in claim 7 wherein said key means includes two pin members and two radial holes.

9. An assembly as set forth in claim 8 wherein said first fastener member comprises an internally threaded lock nut and said second fastener member comprises a threaded lock screw and lock washer.

10. An assembly as set forth in claim 9 wherein said lock screw extends through the locating hole in the tool housing and said lock washer engages a shoulder disposed on the tool housing.

11. An assembly as set forth in claim 10 wherein said adjustment means includes a threaded portion disposed on said tool cartridge means, an adjustment nut having a graduated dial and adapted to be threadably disposed on said tool cartridge means, and seat means disposed on the tool housing and axially disposed with respect to the locating bore for seating said adjustment nut.

12. An assembly as set forth in claim 11 wherein said seat means includes a substantially conical seat and said adjustment nut includes a conical portion adapted to nest in said conical seat.

13. An assembly as set forth in claim 12 wherein said resilient means comprises a coil spring.

14. An assembly as set forth in claim 13 wherein said tool cartridge means comprises an externally threaded tool cartridge.

15. An assembly as set forth in claim 4 wherein said tool cartridge means includes key means and the tool housing includes key ways disposed within the locating hole thereof for nonrotatably maintaining said tool cartridge means therein.

16. An assembly as set forth in claim 15 wherein said key means includes at least one pin member and at least one radial hole in said tool cartridge means for receiving said pin member.

17. An assembly as set forth in claim 16 wherein said key means includes two pin members and two radial holes.

* * * * *